(12) United States Patent
Oguri et al.

(10) Patent No.: US 8,275,010 B2
(45) Date of Patent: Sep. 25, 2012

(54) OPTICAL PULSE AMPLIFIER AND OPTICAL PULSE SOURCE

(75) Inventors: Atsushi Oguri, Tokyo (JP); Shunichi Matsushita, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 349 days.

(21) Appl. No.: 12/136,533

(22) Filed: Jun. 10, 2008

(65) Prior Publication Data

US 2009/0003394 A1    Jan. 1, 2009

(30) Foreign Application Priority Data

Jun. 28, 2007    (JP) .................................. 2007-170770

(51) Int. Cl.
*H01S 3/30*    (2006.01)

(52) U.S. Cl. ........ 372/25; 372/6; 359/341.5; 359/337.5; 359/339; 359/333; 398/80; 398/81; 398/87; 398/146; 398/160; 398/193; 398/199; 398/173; 398/174; 398/175; 398/176; 398/177; 398/178; 398/179; 398/180; 398/181; 385/122; 385/123; 385/14; 385/15; 385/31; 385/88; 385/89; 385/92; 385/94

(58) Field of Classification Search .................... 372/25, 372/6; 359/337.5, 341.1, 333; 398/80, 81, 398/87, 193, 199, 173–181, 146, 160; 385/14, 385/15, 31, 88, 89, 92, 94, 122
See application file for complete search history.

(56) References Cited

U.S. PATENT DOCUMENTS

| | | | |
|---|---|---|---|
| 5,606,445 A | | 2/1997 | Kikuchi et al. |
| 5,880,877 A | * | 3/1999 | Fermann et al. ......... 359/341.31 |
| 5,995,278 A | * | 11/1999 | Kikuchi et al. ............ 359/337.5 |
| 6,885,683 B1 | * | 4/2005 | Fermann et al. ................. 372/25 |
| 6,990,270 B2 | | 1/2006 | Nicholson |
| 7,068,943 B2 | * | 6/2006 | Korolev et al. ............... 398/148 |
| 7,151,880 B2 | * | 12/2006 | Sartori .......................... 385/123 |
| 7,352,504 B2 | | 4/2008 | Hirooka et al. |

(Continued)

FOREIGN PATENT DOCUMENTS

JP    7-74699    3/1995

(Continued)

OTHER PUBLICATIONS

M. E Fermann, V. I. Kruglov et al. "Self-Similar propagation and amplification of parabolic pulses in optical fibers" Physical Review Letters, vol. 84, No. 26, Jun. 26, 2000 and pp. 6010-6013.*

(Continued)

*Primary Examiner* — Armando Rodriguez
*Assistant Examiner* — Delma R Forde
(74) *Attorney, Agent, or Firm* — Oblon, Spivak, McClelland, Maier & Neustadt, L.L.P.

(57) ABSTRACT

The pulse light source according to the present invention comprises: a seed pulse generator 1 for outputting an input pulse 10 as a seed pulse; a pulse amplifier 2; and a dispersion compensator 3 for dispersion compensating a light pulse output from the pulse amplifier 2. Moreover, the pulse amplifier 2 comprises a normal dispersion medium (DCF 4) and an amplification medium (EDF 5) that are multistage-connected alternately, for changing the input pulse 10 to a light pulse having a linear chirp and outputting the light pulse. Furthermore, an absolute value of the dispersion of the DCF 4 becomes to be larger than the absolute value of the dispersion of the EDF 5.

29 Claims, 13 Drawing Sheets

U.S. PATENT DOCUMENTS

| | | | |
|---|---|---|---|
| 7,394,591 B2 * | 7/2008 | Harter et al. | 359/348 |
| 7,486,436 B1 * | 2/2009 | Kuksenkov et al. | 359/333 |
| 7,688,499 B2 * | 3/2010 | Fermann et al. | 359/337.5 |
| 7,869,680 B2 * | 1/2011 | Wei | 385/123 |
| 2004/0028326 A1 | 2/2004 | Fermann et al. | |
| 2004/0240037 A1 * | 12/2004 | Harter | 359/333 |
| 2005/0105865 A1 * | 5/2005 | Fermann et al. | 385/122 |
| 2005/0163426 A1 * | 7/2005 | Fermann et al. | 385/37 |
| 2007/0297810 A1 * | 12/2007 | Tomaru | 398/200 |
| 2008/0130099 A1 * | 6/2008 | Harter | 359/341.1 |

FOREIGN PATENT DOCUMENTS

| | | |
|---|---|---|
| JP | 11-331078 | 11/1999 |
| JP | 2002-118315 | 4/2002 |
| JP | 2003-532931 | 11/2003 |
| JP | 2004-296642 | 10/2004 |
| JP | 2005-148512 | 6/2005 |
| JP | 2005-195751 | 7/2005 |
| JP | 2005-229119 | 8/2005 |
| JP | 2007-516600 | 6/2007 |
| JP | 2007-532005 | 11/2007 |
| JP | 2008-537342 | 9/2008 |
| WO | WO/2005/022705 | 3/2005 |
| WO | WO/2005/094379 | 10/2005 |
| WO | WO/2006/113507 | 10/2006 |

OTHER PUBLICATIONS

M.E Fermann et al. "All-fiber source of 100-nj subpicosecond pulses" Appl. Phys. Lett 61 (11), Mar. 14, 1994 and pp. 1315-1317.*

T. M. Monro et al. "Holey optical fiber: an efficient modal model" Journal of Lightwave technology, vol. 17, No. 6, Jun. 1999 and pp. 1093-1102.*

M. E. Fermann, et al., "Generation and Propagation of high power parabolic pulses in optical fibers", CLEO2000, CME2, pp. 21-22.

Cyril Billet, et al., "Parabolic pulse generation at 1550 nm via Raman amplification in standard telecommunications grade dispersion shifted fiber", CLEO-EP2003,CL6-1FRI, 22 pages.

Y. Ozeki, et al., "Generation of 10GHz Similariton pulse trains from 1.2 km-long erbium-doped fibre amplifier for application to multi-wavelength pulse sources", Electronics Letters, vol. 40, No. 18, Sep. 2, 2004, 2 pages.

B. Kibler, et al., "All-Fiber Source of 20-fs Pulses at 1550 nm Using Two-Stage Linear-Nonlinear Compression of Parabolic Similaritons", IEEE Photonics Technology Letters, vol. 18, No. 17, Sep. 1, 2006, pp. 1831-1833.

B. Kibler, et al., "Parabolic pulse generation in comb-like profiled dispersion decreasing fibre", Electronics Letters, vol. 42, No. 17, Aug. 17, 2006, 2 pages.

Christophe Finot, et al., "Parabolic Pulse Generation through Passive Reshaping of Gaussian Pulses in a Normally Dispersive Fiber", OFC2007, OTuJ3, 3 pages.

Yasuyuki Ozeki, et al., "Clean similariton generation from an initial pulse optimized by the backward propagation method", CLEO2004, CTuBB5, 3 pages.

Office Action issued Feb. 27, 2012, in Japanese Patent Application No. 2007-170770 (with English-language Translation).

Christophe Finot, et al., "Parabolic Pulse Generation Through Passive Nonlinear Pulse Reshaping in a Normally Dispersive Two Segment Fiber Device", Optic Express, Feb. 5, 2007, vol. 15, No. 3, pp. 852-864.

Janet W. Lou, et al., "Experimental Measurements of Solitary Pulse Characteristics from an All-Normal-Dispersion Yb-Doped Fiber Laser", Optics Express, Apr. 16, 2007, vol. 15, No. 8, pp. 4960-4965.

* cited by examiner

OPTICAL PULSE AMPLIFIER AND OPTICAL PULSE SOURCE

BACKGROUND OF THE INVENTION

1. Technical Field

The present invention relates to a pulse amplifier and a pulse light source using the same, and more specifically to the pulse light source suitable to use not only for a telecommunication sector but also for a non-telecom sector wherein a pulse of large peak power is required especially, such as a micro processing, a light source for generating a terahertz wave, a measurement, a biotechnological application, a multiphoton microscope, or the like.

2. Related Arts

Regarding such the pulse light source, an ultrashort pulse light source of a fiber type is attractive for an industrial application, because it is superior to a solid state laser from points of view of a small sized packaging, an operability, and robustness to the environment of such as dust, temperature, humidity, vibration, or the like. Moreover, regarding such the pulse light source, some developments are progressed for a shorter pulse and a higher pulse energy.

It is important to suppress a nonlinear chirp for progressing such the shorter pulse and the higher pulse energy regarding the pulse light source, because the nonlinear chirp causes a worse pulse quality. Moreover, an effect of a self phase modulation (SPM), which is one of nonlinear phenomena in an optical fiber, becomes larger as the peak power of the pulse becomes larger due to the shorter pulse or the higher pulse energy. Furthermore, due to such the SPM, a phase shift proportional to a time differential of a light intensity is to be additionally generated in the pulse, and generally a nonlinear chirp is to be additionally generated therein.

However, in the case of being the light intensity parabolic functional the additionally generated chirp becomes to be linear functional even in the case of the SPM occurring, because the time differential of the light intensity is a linear function. Therefore, a parabolic functional pulse is an ideal waveform for progressing the shorter pulse and the higher pulse energy. Such the parabolic functional pulse is to be changed similarly in pulse waveform thereof, at the period of propagating through a normal dispersion gain medium. And, such the pulse is called a similariton.

However, generally it is hard to generate such the ideal parabolic functional pulse, and the following conventional technologies are known therefor.

1. A technology for generating a similariton pulse (a parabolic functional pulse) using an ytterbium (Yb) doped fiber amplifier (Yb-DFA), with using an input pulse with a pulse width of several hundreds femtoseconds (fs), such as 200 fs for example (refer to a nonpatent document 1 for example).

2. A technology for generating a parabolic functional pulse using a Raman amplifier with a length of 6 km, with using an input pulse with the pulse width of ten picoseconds (ps) output from a gain-switched light source (refer to a nonpatent document 2 for example).

3. A technology for generating a parabolic functional pulse using an erbium (Er) doped fiber (EDF) with the length of 1.2 km, with using an input pulse with the pulse width of 2.4 ps (refer to a nonpatent document 3 for example).

4. A technology for generating a parabolic functional pulse using an EDF and a highly non-linear fiber (HNLF), with using an input pulse with the pulse width of 1.4 ps generated by a mode-locked laser (refer to a nonpatent document 4 for example).

5. A technology for generating a parabolic functional pulse using a comb-like dispersion profiled fiber (CDPF) comprised of six types of fibers having different dispersion characteristics, with using an input pulse with the pulse width of 190 fs (refer to a nonpatent document 5 for example).

6. A technology for generating a parabolic functional pulse by using only a normal dispersion fiber (refer to a nonpatent document 6 for example).

Nonpatent document 1: M. F. Fermann, CLEO2000, CME2.
Nonpatent document 2: C. Billet et al., CLEO-EP2003, CL6-1-FRI.
Nonpatent document 3: Y. Ozeki et al., Electron. Lett., vol. 40, p. 1103 (2004).
Nonpatent document 4: B. Kibler, Photon. Technol. Lett., vol. 18, p. 1831 (2006).
Nonpatent document 5: B. Kibler et al., Electron. Lett., vol. 42, p. 965 (2006).
Nonpatent document 6: C. Finot et al., OFC2007, OTuJ3.
Nonpatent document 7: Y. Ozeki et al., CLEO2004, CTuBB5.

However, such the abovementioned conventional technologies include the following disadvantages. According to the technology regarding the nonpatent document 1, a seed pulse light source tends to be limited to a narrow pulse width. Moreover, characteristics of an amplification medium tend to be limited therein. According to the technology regarding the nonpatent document 2, the Raman amplifier has an insufficient conversion efficiency, and then the quite long Raman amplifier with the length of 6 km is required. Such the Raman amplifier of 6 km is not suitable for the small sized packaging as it is difficult to store. According to the technology regarding the nonpatent document 3, the EDF with the extraordinary long length of 1.2 km comparing to an ordinary EDF with the length of several meters to several tens meters. It is hard to store such the EDF of 1.2 km. Moreover, a total cost becomes higher because such the EDF of 1.2 km is extremely expensive. According to the technology regarding the nonpatent document 4, a configuration is used in which the EDF and the HNLF are comprised, and the HNLF is used just for a nonlinear medium with no expectation of an effect as a normal dispersion medium. According to the technology regarding the nonpatent document 5, using six types of fibers causes the higher cost.

Moreover, according to the technology regarding the nonpatent document 6, a pulse is amplified to be with the optimum pulse energy for generating a parabolic functional pulse using an erbium doped fiber amplifier (EDFA), and then the parabolic functional pulse is to be generated by using a nonlinear effect and a dispersion effect in the normal dispersion fiber. However, such the method is not suitable to spread a spectrum because a peak power is to be decreased due to a dispersion during a propagation thereof. Furthermore, the EDFA is used just as the amplification medium without suggesting a use of an SPM effect in the EDFA.

Furthermore, it is necessary to balance optimally on a gain, a normal dispersion and an SPM, for amplifying a pulse with maintaining the pulse having a linear chirp. However, it is not so easy to provide the optimum medium therefor.

That is to say, the following input pulse is regarded as the optimum, for generating ideal parabolic functional pulse regarding the normal dispersion EDFA (refer to the above mentioned nonpatent document 7).

$$T_0 = 1.64\sqrt{(\beta_2/g)}, E_{in} = 0.38\sqrt{(\beta_2 g)}/\gamma.$$

Here, the $T_0$ designates a half width of the input pulse, the $E_{in}$ shows a pulse energy of the input pulse, the $\beta_2$ designates a second order dispersion, the $\gamma$ designates a nonlinear coefficient, and the g designates a gain coefficient. For example, in the case of assuming 1.1 dB/m=253/km for the gain coefficient of an EDF and a full width at half maximum of 2 ps (the half width of 1.20 ps) for the input pulse, it becomes necessary to provide the EDF of extraordinary large normal dispersion as it is almost impossible to obtain, because the required dispersion for the EDF is estimated to be 136 ps$^2$/km=−106 ps/nm/km thereby. That is to say, it is hard in particular to generate a parabolic functional pulse from a light pulse with the pulse width of not less than two picoseconds approximately with using such the normal dispersion EDF.

SUMMARY OF THE INVENTION

The present invention is presented with having regard to such the above mentioned conventional problems, and an object is to provide a pulse amplifier and a pulse light source using the same, for being able to easily obtain any of proper media for an amplification and for a wider bandwidth with maintaining a linear chirp of a light pulse, for easy designing and for lower manufacturing cost by using therewith.

For solving the above mentioned problems, a pulse amplifier according to a first aspect of the present invention comprises an amplification medium and a normal dispersion medium that are multistage-connected alternately, for changing an input pulse to a light pulse having a linear chirp in a bandwidth range of wider than that for the input pulse and outputting the light pulse.

According to the aspect, it is able to change the normal dispersion of the normal dispersion medium to be larger for example, and to change a gain coefficient of the amplification medium, by multistage connecting the normal dispersion medium and the amplification medium alternately. And then it is able to easily obtain any of proper media for an amplification and for a wider bandwidth with maintaining the linear chirp of the light pulse. Hence, it becomes able to realize a pulse amplifier for easy designing and for lower manufacturing cost by using therewith. Moreover, it becomes able to obtain a short pulse with an ideal waveform in the wide bandwidth range by dispersion compensating, because the input pulse is to be output as the light pulse having the linear chirp.

In the pulse amplifier according to a second aspect of the present invention, the multistage-connected media include at least three in total of the amplified media and the normal dispersion media that are multistage-connected alternately.

In the pulse amplifier according to a third aspect of the present invention, the amplification medium is a rare earth doped optical fiber.

In the pulse amplifier according to a fourth aspect of the present invention, a dispersion of the rare earth doped optical fiber is a normal dispersion.

In the pulse amplifier according to a fifth aspect of the present invention, an absolute value of the dispersion of the normal dispersion medium is larger than the absolute value of the dispersion of the amplification medium.

In the pulse amplifier according to a sixth aspect of the present invention, the amplification medium and the normal dispersion medium are a polarization maintaining type.

According to the aspect, it is able to realize a pulse amplifier for outputting a linearly polarized light pulse, and then it is desirable from an application point of view.

In the pulse amplifier according to a seventh aspect of the present invention, a time waveform of the light pulse having the linear chirp is parabolic functional.

According to the aspect, it becomes able to obtain the short pulse with the ideal waveform in the wide bandwidth range by dispersion compensating, because the parabolic functional pulse with the parabolic time waveform is to be output as the light pulse having the linear chirp.

In the pulse amplifier according to an eighth aspect of the present invention, the normal dispersion media and the amplified media are multistage-connected as not less than three stages.

For solving the above mentioned problems, a pulse light source according to a ninth aspect of the present invention comprises: a seed pulse generator for outputting a seed pulse; and a pulse amplifier comprising an amplification medium and a normal dispersion medium that are multistage-connected alternately, wherein the pulse amplifier changes an input pulse to a light pulse having a linear chirp in a bandwidth range of wider than that for the input pulse and outputs the light pulse.

According to the aspect, it is able to change the normal dispersion of the normal dispersion medium to be larger for example, and to change the gain coefficient of the amplification medium, by multistage connecting the normal dispersion medium and the amplification medium alternately. And then it is able to easily obtain any of the proper media for the amplification and for the wider bandwidth with maintaining the linear chirp of the light pulse. Hence, it becomes able to realize a pulse light source for easy designing and for lower manufacturing cost by using therewith. Moreover, it becomes able to obtain the short pulse with the ideal waveform in the wide bandwidth range by dispersion compensating, because the input pulse is to be output as the light pulse having the linear chirp.

In the pulse light source according to a tenth aspect of the present invention, the multistage-connected media include at least three in total of the amplified media and the normal dispersion media that are multistage-connected alternately.

In the pulse light source according to an eleventh aspect of the present invention, the amplification medium is a rare earth doped optical fiber.

In the pulse light source according to a twelfth aspect of the present invention, a dispersion of the rare earth doped optical fiber is a normal dispersion.

In the pulse light source according to a thirteenth aspect of the present invention, an absolute value of the dispersion of the normal dispersion medium is larger than the absolute value of the dispersion of the amplification medium.

In the pulse light source according to a fourteenth aspect of the present invention, the amplification medium and the normal dispersion medium are a polarization maintaining type.

According to the aspect, it is able to realize a pulse light source for generating the linearly polarized light pulse, and then it is desirable from the application point of view.

In the pulse light source according to a fifteenth aspect of the present invention, a time waveform of the light pulse having the linear chirp is parabolic functional.

According to the aspect, it becomes able to obtain the short pulse with the ideal waveform in the wide wave band range by dispersion compensating, because the parabolic functional pulse with the parabolic time waveform is to be output as the light pulse having the linear chirp.

In the pulse light source according to a sixteenth aspect of the present invention, a full width at half maximum of the seed pulse output from the seed pulse generator is not less than two picoseconds.

In the pulse light source according to a seventeenth aspect of the present invention, the seed pulse generator comprises a laser source of a direct modulating type for a semiconductor laser, as a seed pulse light source for outputting a seed pulse.

In the pulse light source according to an eighteenth aspect of the present invention, the laser source is a gain-switched light source for gain switch driving the semiconductor laser.

According to the aspect, it is able to output a light pulse with a pulse width of several picoseconds as a light pulse having a linear chirp. And then it becomes able to realize a pulse light source using a gain-switched light source that it is able to easily generate a light pulse having the pulse width of picosecond order, that it is able to easily synchronize with other equipments and devices by using therewith, and that it is able to easily change a pulse repetition frequency thereof. Thus, it becomes able to realize the pulse light source, with a lower manufacturing cost and for a wider range of industrial application by using therewith.

The pulse light source according to a nineteenth aspect of the present invention further comprises a dispersion compensator for further dispersion compensating a light pulse output from the pulse amplifier.

According to the aspect, it becomes able to obtain the short pulse with the ideal waveform in the wide wave band range by dispersion compensating, because an input pulse is to be output from the pulse amplifier as the light pulse having the linear chirp.

In the pulse light source according to a twentieth aspect of the present invention, the dispersion compensator is an anomalous dispersion fiber.

In the pulse light source according to a twenty-first aspect of the present invention, the dispersion compensator is comprised of a grating pair.

In the pulse light source according to a twenty-second aspect of the present invention, the normal dispersion media and the amplified media are multistage-connected as not less than three stages.

BRIEF DESCRIPTION OF THE DRAWINGS

The above and other objects and features of the invention will appear more fully hereinafter from a consideration of the following description taken into connection with the accompanying drawing wherein one example is illustrated by way of example, in which.

DETAILED DESCRIPTION OF THE INVENTION

Each embodiment of a pulse light source according to the present invention will be described in detail below, based on the drawings. Here, a similar part is designated by the similar symbol and a duplicated description is to be omitted regarding a description for each of the embodiments.

The First Embodiment

Figure 1:
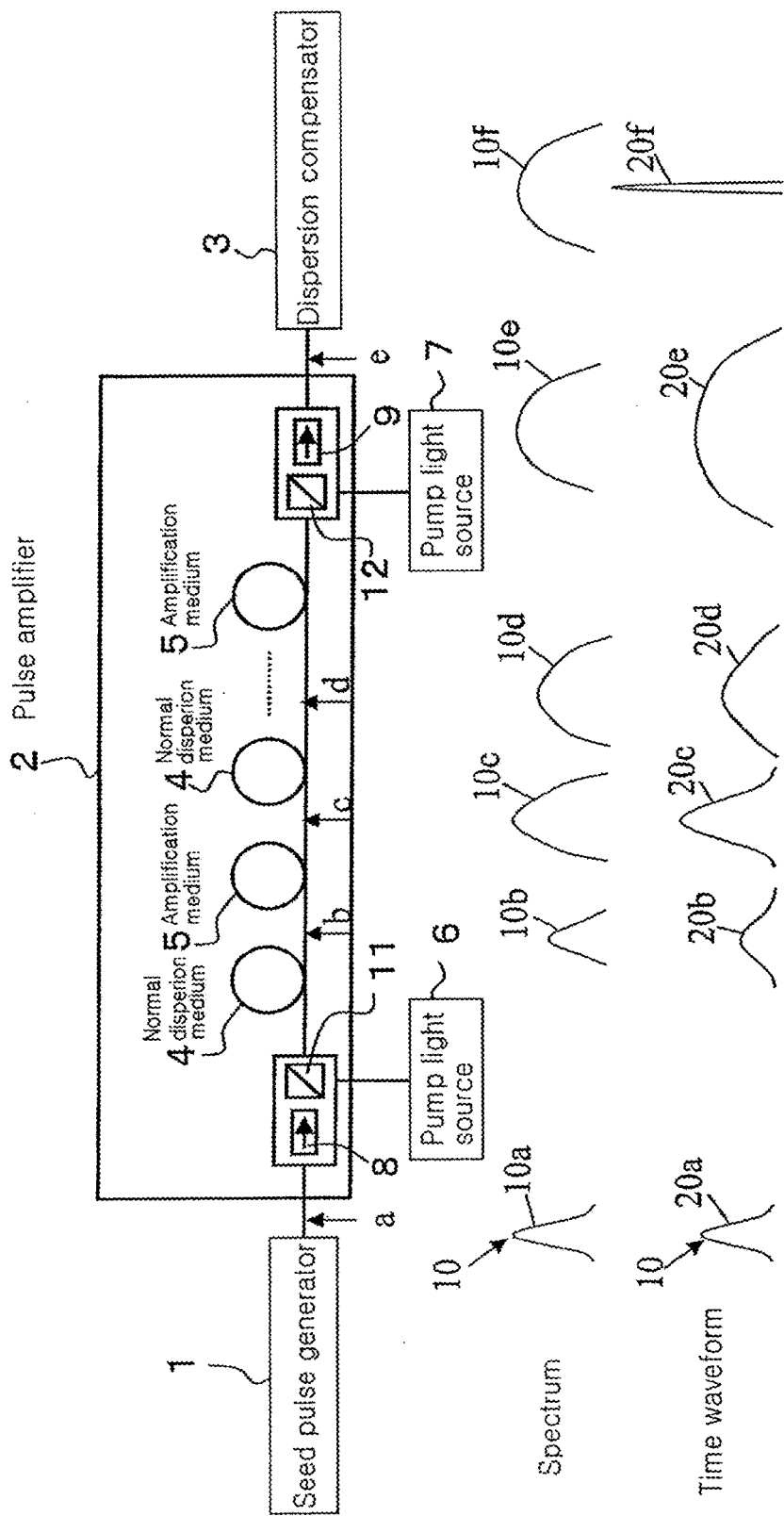
FIG. 1 is a view showing a brief configuration of a pulse light source according to the first embodiment of the present invention, with spectra and time waveforms for pulses at each part in the pulse light source.

FIG. 1 shows a brief configuration of a pulse light source according to the first embodiment of the present invention, with spectra and time waveforms for pulses at each part in the pulse light source.

The pulse light source comprises: a seed pulse generator 1 for outputting an input pulse 10 as a seed pulse; a pulse amplifier 2; and a dispersion compensator 3 for dispersion compensating a light pulse output from the pulse amplifier 2, as shown in FIG. 1.

The seed pulse generator 1 comprises a laser source of a direct modulating type for a semiconductor laser, as a seed pulse light source for outputting the input pulse 10. Such the laser source is to be a gain-switched light source for being able to generate the input pulse 10 having a pulse width of not less than two picoseconds (ps) approximately for example. Moreover, it may be available to use such as a mode-locked laser or the like for the seed pulse generator 1. Here, so-called the pulse width designates a full width at half maximum of the input pulse 10 as the seed pulse output from the seed pulse generator 1.

The pulse amplifier 2 comprises a normal dispersion medium 4 and an amplification medium 5 that are multistage-connected alternately, for changing an input pulse to a light pulse having a linear chirp in a bandwidth range of wider than that for the input pulse and outputting the light pulse. The normal dispersion medium 4 according to the present embodiment is to be a dispersion compensating fiber (DCF) as one example. Moreover, the amplification medium 5 is a rare earth doped optical fiber having a normal dispersion, and then according to the present embodiment, an erbium doped fiber (EDF) as one kind of the rare earth doped optical fiber is to be used as one example. That is to say, the dispersion of such the EDF is the normal dispersion. Moreover, an absolute value of the dispersion (the normal dispersion) of the DCF (the normal dispersion medium 4) is larger than the absolute value of the dispersion (the normal dispersion) of the EDF (the amplification medium 5). Here, the normal dispersion medium 4 and the amplification medium 5 are provided in order according to the pulse amplifier 2 in FIG. 1, however, the order may be reversed. Furthermore, either one of the amplification medium 5 or the normal dispersion medium 4 may be provided at an end part.

Here, according to the present specification, the number and the stage number are used with distinguishing regarding the DCF 4 and the EDF 5 multistage-connected therebetween. That is to say, the number means the number in total of the DCFs 4 and the EDFs 5 connected alternately, meanwhile, the stage number means the number of pairs that one of the DCFs 4 and one of the EDFs 5 comprise one pair (the order is no object). Hence, in the case of two stages for the stage number regarding the DCF 4 and the EDF 5 multistage-connected for example, there are provided two of DCFs 4 and two of EDFs 5, and then the number in total becomes four. Here, there are provided at least three for the number in total of the EDFs 5 (the amplified media) and of the DCFs 4 (the normal dispersion media) alternately connected in the pulse amplifier 2.

The pulse amplifier 2 comprises a configuration that a pump light is input from either one of two pump light sources 6 and 7 to the EDF 5 as a bi-directional excitation. In FIG. 1, the symbols 8 and 9 designate isolators, the symbols 11 and 12 designate wavelength division multiplexing (WDM) couplers for multiplexing the input pulse 10 and the pump light from the pump light source 6 or 7.

According to such the pulse amplifier 2, plural stages of the DCFs 4 and the EDFs 5 are arranged alternately, for starting from the DCF 4 and then for ending with the EDF 5. Moreover, all plural stages of the DCFs 4 and the EDFs 5 are arranged in a same package according to such the pulse amplifier 2.

The dispersion compensator 3 according to the present embodiment is to be an anomalous dispersion fiber as one example.

Moreover, the symbols 10a to 10e in FIG. 1 designate graphs showing spectra for a light pulse at each of parts (a) to (e) in the pulse light source respectively. That is to say, the graphs 10a to 10d show spectra of the input pulse 10 and the graph 10e shows a spectrum of a light pulse output from the pulse amplifier 2 respectively. Moreover, the graph 10f shows a spectrum for a light pulse (an output pulse) after dispersion compensating in the dispersion compensator 3. Here, the horizontal axis designates a frequency and the vertical axis designates a light intensity in each of the graphs 10a to 10f.

Moreover, the symbols 20a to 20e in FIG. 1 designate graphs showing time waveforms for the light pulse at each of parts (a) to (e) in the pulse light source respectively. That is to say, the graphs 20a to 20d show time waveforms of the input pulse 10 and the graph 20e shows a time waveform of the light pulse output from the pulse amplifier 2 respectively. Moreover, the graph 20f shows a time waveform for the light pulse as the output pulse after dispersion compensating in the dispersion compensator 3. Here, the horizontal axis designates a time and the vertical axis designates a light intensity in each of the graphs 20a to 20f.

In the pulse amplifier 2 of the pulse light source, the input pulse 10 is to be amplified with having a linear chirp and with maintaining an ideal waveform thereof, by multistage connecting the DCF 4 and the EDF 5 alternately. That is to say, it is comprised for outputting a light pulse with maintaining the linear chirp. Moreover, the spectrum of the input pulse 10 is to be broadened gradually at the period of propagating through the DCFs 4 and the EDFs 5 in the pulse amplifier 2, as shown in the graphs 10b to 10d. And then gradually it reaches to be parabolic, as shown in the graphs 20b to 20d. Hence, it is to be output as a parabolic functional pulse with having the linear chirp from the pulse amplifier 2, as shown in the graph 20e. Moreover, the pulse output from the amplifier 2 is to be a light pulse with a wide bandwidth (refer to the graph 10e).

Thus, the light pulse output from the amplifier 2 becomes to be the parabolic functional pulse having the linear chirp (refer to the graph 20e), and then it becomes able to obtain a short pulse as shown in the graph 20f after dispersion compensating in the dispersion compensator 3. Moreover, such the short pulse is to be a light pulse having an ideal waveform with less pedestal in a wide bandwidth range, as shown in the graph 10f.

Regarding the pulse light source in FIG. 1, it is desirable to output a light pulse as linearly polarized, however, it is not limited thereto. Here, a DCF 4 and an EDF 5 are comprised of polarization maintaining type fibers respectively. Moreover, each of the seed pulse generator 1 and the dispersion compensator 3 comprises a configuration for maintaining the polarization respectively thereof. Furthermore, any of polarization maintaining technologies using such as a Faraday rotator mirror or the like may be applicable to a DCF 4 of non-polarization maintaining type and an EDF 5 of non-polarization maintaining type.

Here, it is not required to maintain an EDF length (the length for each of the EDFs 5) and a DCF length (the length for each of the DCFs 4) as constant at each of the stages (every pair thereof), that is to say, the EDF length and the DCF length may be constant, or may be different respectively. For example, it may be available to change the EDF length and/or the DCF length step by step for each of the stages.

Moreover, for obtaining the parabolic functional pulse as shown in the graph 20e using the input pulse 10 having the pulse shape of Gaussian as shown in the graph 20a, it is necessary to optimize the three elements of the gain, the SPM and the normal dispersion of the input pulse 10 respectively.

Normally a frequency shift by an SPM has a maximal value or a minimal value at a point of inflection in a time waveform thereof. And then at the time of a normal dispersion interacting thereto, an element of the frequency shift as closer to the maximal value or the minimal value in the time waveform is to be dispersed further away from the time waveform shape inside. That is to say, the point of inflection in the time waveform is to be gradually dispersed away from the time waveform shape inside, and then such the time waveform becomes closer to parabolic functional as there becomes no point of inflection therein. Moreover, the time waveform of a light pulse cannot help but become expanded due to the normal dispersion effect, and then a peak power of the light pulse cannot help but become decreased thereby. Hence, an effect from the SPM cannot help but become decreased during a propagation of the light pulse. Therefore, it is able to maintain the effect from the SPM and the normal dispersion by increasing the peak power using the gain.

Moreover, it is necessary to proportionate optimally regarding the effect from an SPM, a normal dispersion and a gain, for forming a parabolic functional pulse and for a similar propagation thereof. However, a nonlinear chirp becomes easy to be add therein, in the case of the effect from the SPM being larger than that from other two factors. Meanwhile, a spectal range becomes difficult to be broadened, and then a time waveform becomes hard to be closer to parabolic functional, in the case of the effect from the normal dispersion being larger. Furthermore, the effect from the SPM becomes smaller with the propagation thereof, in the case of the effect from the gain being smaller. Meanwhile, the effect from the SPM cannot help but become larger with the propagation thereof, in the case of the effect from the gain being larger.

Regarding an approximate value empirically optimum for modifying a seed pulse to a parabolic functional pulse using the normal dispersion EDFA according to the relationship among the SPM, the normal dispersion and the gain, there are reported in some papers, such as in the above mentioned nonpatent document 7 for example. However, it becomes necessary to provide the EDF of the extraordinary large absolute value of the normal dispersion as it is almost impossible to obtain in real life, in the case of calculating following the paper regarding an optimum fiber parameter for an input pulse having a full width at half maximum of picosecond order. Hence, it is difficult to form such the parabolic functional pulse.

On the contrary, it becomes possible to realize the following according to the present embodiment, by multistage connecting alternately the DCF 4 as the normal dispersion medium and the EDF 5 as the amplification medium.

1. It becomes able to broaden a spectrum of a light pulse using the SPM (the nonlinear effect of an optical fiber) and the gain regarding the EDF 5 as the amplification medium.

2. It becomes able to compensate a normal dispersion insufficient for forming a parabolic functional pulse, by using a large amount of the normal dispersion of the DCF 4 as the normal dispersion medium. Moreover, it becomes able to broaden the spectrum of the light pulse further, by using the SPM regarding the DCF 4 as the normal dispersion medium.

3. Normally a peak power becomes smaller in the case of broadening a waveform using the normal dispersion, and then the SPM becomes hard to occur. However, according to the present embodiment, it is able to generate the SPM effectively by giving the gain using the EDF 5 arranged alternately with the DCF 4 for compensating the insufficient amount thereof.

Thus, according to the present embodiment, it becomes able to control easily regarding both of the normal dispersion and the SPM, by multistage connecting alternately the DCF 4 as the normal dispersion medium and the EDF 5 as the amplification medium therebetween. Moreover, it becomes able to realize the effect from the normal dispersion by using such the multistage connection, which is difficult to realize using only the EDFs. Hence, it becomes able to obtain any of proper media for modifying a seed pulse to a parabolic functional pulse, that is to say, for an amplification and for a wider wave band with maintaining a linear chirp of a light pulse.

Moreover, it becomes able to realize a pulse amplifier and a pulse light source using the same, for being possible to output a parabolic functional pulse having a linear chirp by using therewith, because it becomes able to easily obtain any of the proper media for the amplification and for the wider bandwidth with maintaining the linear chirp of the light pulse.

Moreover, it becomes able to realize a pulse amplifier and a pulse light source using the same, for easy designing and for lower manufacturing cost by using therewith, because it becomes able to obtain any of the proper media for the amplification and for the wider-bandwidth with maintaining the linear chirp of the light pulse.

Moreover, it becomes easy to design a pulse amplifier and a pulse light source using the same, because it is able to separate a part in which the normal dispersion and the SPM are mainly effective, from a part in which the gain and the SPM are mainly effective, by the multistage-connected configuration regarding the DCF 4 and the EDF 5 alternately in the pulse amplifier 2.

Moreover, the input pulse 10 is to be amplified in the pulse amplifier 2 as a light pulse with maintaining the ideal waveform and with having the linear chirp, that is to say, the light pulse is to be output with maintaining the linear chirp from the pulse amplifier 2. And then it becomes able to obtain a short pulse by dispersion compensating in the dispersion compensator 3. Furthermore, such the short pulse becomes to be the light pulse having the ideal waveform with less pedestal in the wide wave band range, as shown in the graph 10*f*.

Here, a gain-switched light source is used for the seed pulse generator 1, as a seed pulse light source for outputting the input light pulse 10. And such the g gain-switched light source has some advantages, such as that it is able to easily generate a light pulse having the pulse width of picosecond order, that it is able to easily synchronize with other equipments and devices, that it is able to easily change a pulse repetition frequency thereof, or the like. However, it is not so easy to realize an amplification for a light pulse with maintaining the linear chirp using any of ordinary EDFAs, because of the pulse width of picosecond order thereof. On the contrary, according to the present embodiment, it is able to change a light pulse with the pulse width of several picoseconds to a light pulse having the linear chirp from the pulse amplifier 2 and to output it. And then it becomes able to realize a pulse light source using the gain-switched light source that it is able to easily generate the light pulse having the pulse width of picosecond order, that it is able to easily synchronize with other equipments and devices, and that it is able to easily change the pulse repetition frequency thereof. Thus, it becomes able to realize the pulse light source, with a lower manufacturing cost and for a wider range of industrial application by using therewith.

Moreover, the spectrum of the input pulse 10 output from the seed pulse generator 1 gradually reaches to be parabolic functional at the period of propagating through the DCFs 4 and the EDFs 5 in the pulse amplifier 2, as shown in the graphs 20*b* to 20*d*. And then it becomes able to output the input pulse 10 from the pulse amplifier 2 as the parabolic functional pulse having the linear chirp as shown in the graph 20*e*.

Here, the DCF 4 and the EDF 5 are comprised of the polarization maintaining type fibers respectively. Moreover, each of the optical fibers for connecting to between each element in the pulse light source is also comprised of the polarization maintaining type fibers respectively. Therefore, it is able to realize a pulse light source for generating a linearly polarized light pulse by such the configuration, and then it is desirable from the application point of view. Moreover, it is preferable to input a linearly polarized seed pulse (the input pulse 10) into the pulse amplifier 2, because it becomes easier to obtain the nonlinear effect (the SPM) in such the pulse amplifier 2.

According to the conventional technology reported in the above mentioned nonpatent document 6, the input pulse of Gaussian waveform is modified using only the normal dispersion fibers (DCFs). On the contrary, according to the present embodiment, the input pulse of Gaussian waveform is gradually modified to the parabolic functional pulse at the period of such the input pulse propagating one by one through the DCFs 4 and the EDFs 5 arranged alternately in the pulse amplifier 2. Hence, a degree of freedom becomes to be enhanced for designing a pulse amplifier and a pulse light source using the same, for being possible to output a parabolic functional pulse having the linear chirp, and then it becomes easier to design therefor.

According to the conventional technology reported in the above mentioned nonpatent document 6, the similariton pulse is generated using only the normal dispersion fibers. Hence, the time waveform of the pulse becomes broadened due to the dispersion thereof, and then the peak power of the pulse becomes decreased at the period of the propagation thereof. Therefore, the SPM as the nonlinear effect becomes hard to occur, and then it is not suitable for the wider bandwidth. On the contrary, according to the present embodiment, it becomes able to propagate the pulse with broadening the spectrum using the SPM of the optical fibers (the DCF 4 and the EDF 5) with maintaining the pulse shape of the parabolic functional pulse, by giving the gain using the EDF 5 arranged alternately with the DCF 4 for compensating the SPM as the nonlinear effect to avoid from becoming hard to occur.

Example 1

Next, (Example 1) will be described in detail below, based on FIG. 2 to FIG. 4, which is obtained by a simulation with using the following conditions (Simulation condition 1) regarding the pulse light source described in the above mentioned first embodiment.

(Simulation Condition 1)
 1. Input pulse (the input pulse 10):
 Pulse shape: Gaussian,
 Pulse width: 5.1 ps,
 Peak power: 0.8 W,
 Pulse energy: 4.3 pJ.
 2. DCF 4:
 Gain: −0.5 dB/km,
 Dispersion: −125 ps/nm/km,
 Nonlinear coefficient: 5.3/W/km.
 3. EDF 5:
 Gain: 1.1 dB/m,
 Dispersion: −4.9 ps/nm/km,
 Nonlinear coefficient: 7.5/W/km.
 4. DCF+EDF:
 Stage number: Five-stage,
 EDF length: 5 m,
 DCF length: Parameter (x times the EDF length).

Figure 2:
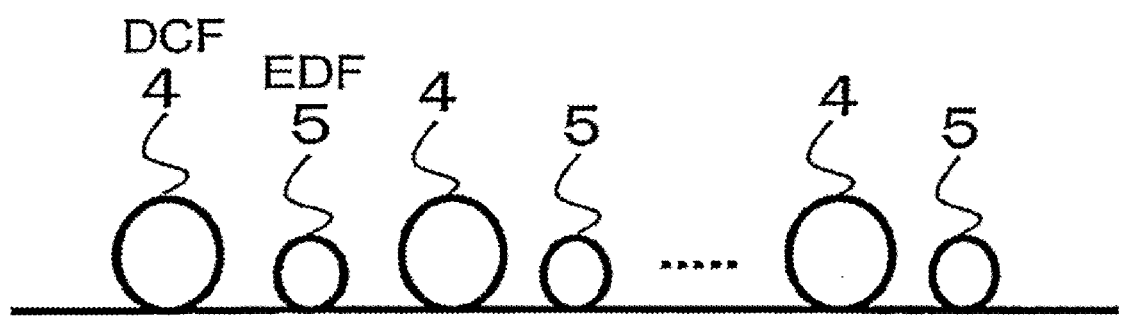
FIG. 2 is a view showing a brief configuration of a pulse amplifier part according to (Example 1).

According to such (Example 1), the stage number is fixed as five-stage for the DCFs 4 and the EDFs 5 multistage-connected as shown in FIG. 2 regarding the pulse amplifier 2 in the pulse light source described in the above mentioned first embodiment. And then the value of the x is to be changed with the DCF length (the length of the DCF 4) as the parameter (x times the EDF length). Simulated results (Simulation result 1) are shown in FIG. 3 and FIG. 4. In FIG. 3, (A) shows a relationship between a time waveform 10 and a chirp 30 for an input pulse, and (B) to (I) show relationships between the time waveform 10 and the chirp 30 for an output pulse in the case of changing the value of the x as 0 and from 2 to 8 respectively. Moreover, In FIG. 4, (A) shows a spectrum for the input pulse, and (B) to (I) show spectra for the output pulse in the case of changing the value of the x as 0 and from 2 to 8 respectively.

Figure 3:
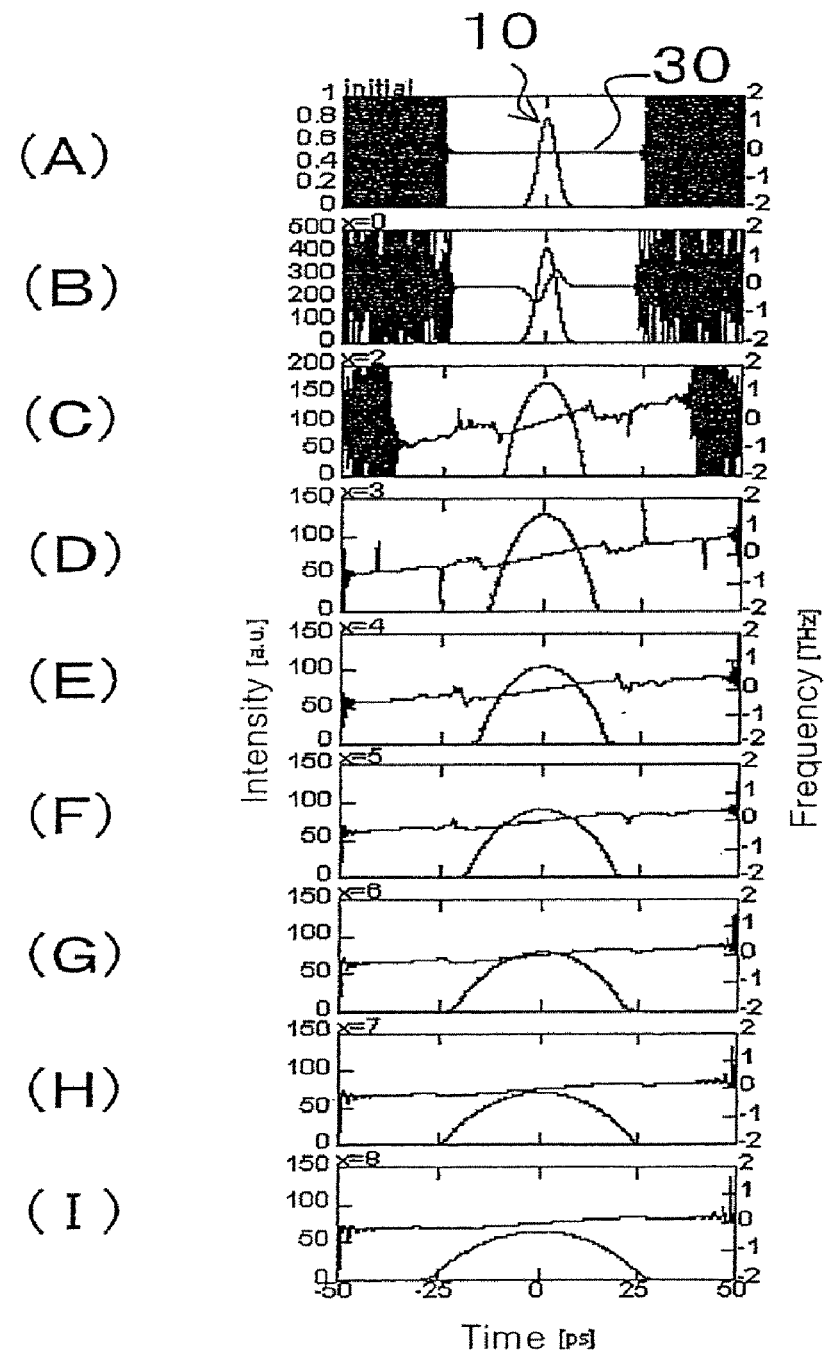
FIG. 3 is a graph showing relationships between a time waveform and a chirp for an input pulse or for output pulses in the case of changing a value of an x with a DCF length as a parameter (x times the EDF length), from (A) through (I).
Figure 4:
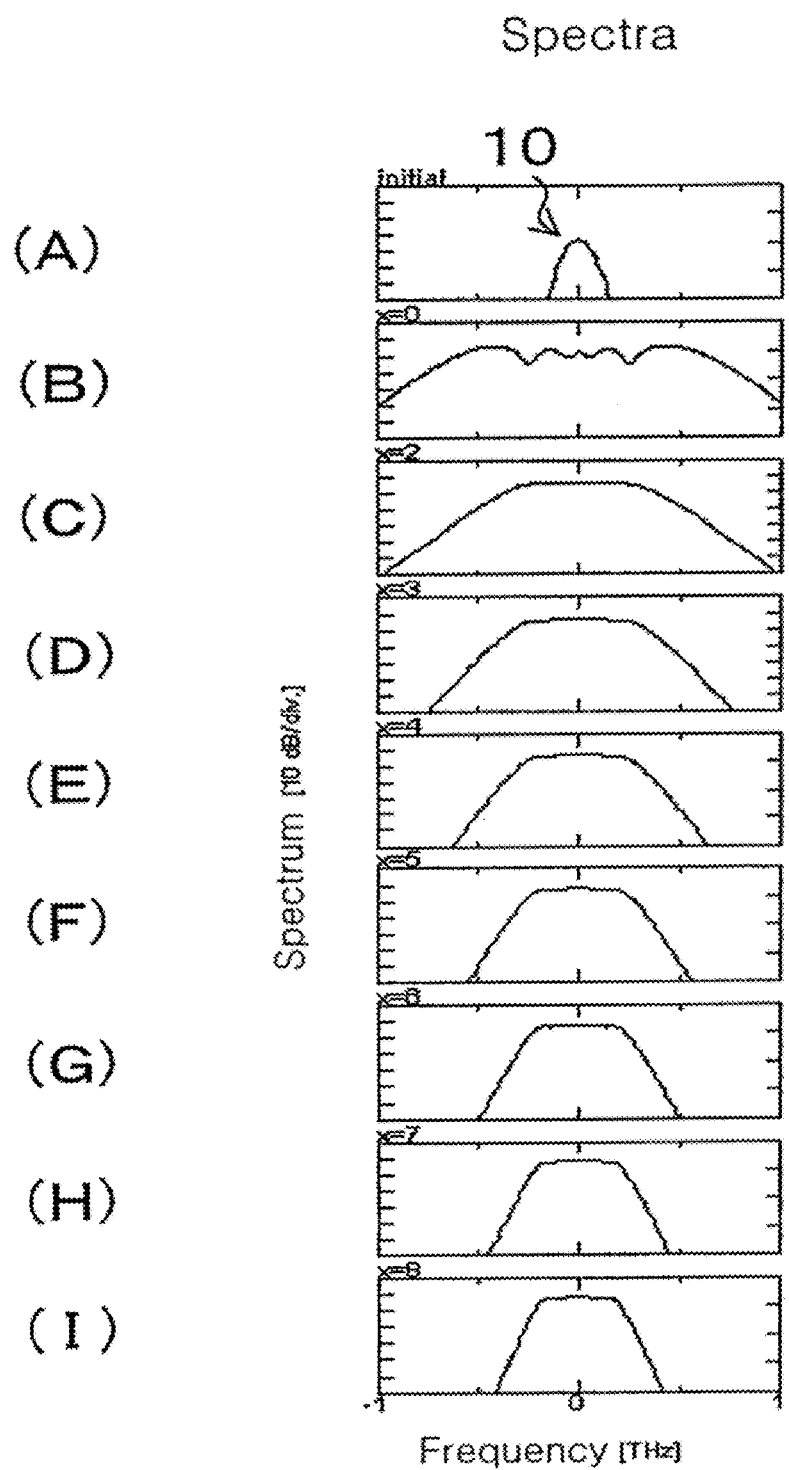
FIG. 4 is a graph showing spectra for an input pulse or for output pulses in the case of changing the value of the x, from (A) through (I).

According to FIG. 3: from (A) through (I) and FIG. 4: from (A) through (I), the following simulated results are obtained.

1. The input pulse becomes a parabolic functional pulse having the linear chirp by the multistage connection of the DCFs 4 and the EDFs 5. However, x=0, that is to say, in the case of not using any of the DCFs 4, the chirp is remained as nonlinear functional.
 2. The waveform of the input pulse becomes closer to parabolic functional and the chirp becomes closer to linear functional with enhancing the dispersion effect (increasing the value of the x).
 3. In the case of enhancing too much regarding the dispersion effect (increasing too much regarding the value of the x), the nonlinear phase shift becomes smaller, and then it becomes hard to broaden the spectal range, because of the peak power of the light pulse becoming decreased.

Example 2

Next, (Example 2) will be described in detail below, based on FIG. 5 and FIG. 6, which is obtained by the simulation with using the following conditions (Simulation condition 2) regarding the pulse light source described in the above mentioned first embodiment.

(Simulation Condition 2)
 1. Input pulse (the input pulse 10):
 Pulse shape: Gaussian,
 Pulse width: 5.1 ps,
 Peak power: 0.8 W,
 Pulse energy: 4.3 pJ.
 2. DCF 4:
 Gain: −0.5 dB/km,
 Dispersion: −125 ps/nm/km,
 Nonlinear coefficient: 5.3/W/km.
 3. EDF 5:
 Gain: 1.1 dB/m,
 Dispersion: −4.9 ps/nm/km,
 Nonlinear coefficient: 7.5/W/km.
 4. DCF+EDF:
 Stage number: Parameter,
 EDF length: (25/stage number) m,
 DCF length: (100/stage number) m,
  (=four times the EDF length).

According to such (Example 2), a ratio between the DCF length and the EDF length is fixed (the DCF length is fixed as four times the EDF length), for the DCFs 4 and the EDFs 5 multistage-connected as shown in FIG. 2 regarding the pulse amplifier 2 in the pulse light source described in the above mentioned first embodiment. And then with the stage number of the DCFs 4 and the EDFs 5 as the parameter, a value of the stage number is to be changed. Simulated results (Simulation result 2) are shown in FIG. 5 and FIG. 6. In FIG. 5, (A) shows a relationship between a time waveform 10 and a chirp 30 for an input pulse, and (B) to (G) show relationships between the time waveform 10 and the chirp 30 for an output pulse in the case of changing the value of the stage number respectively. Moreover, each of dashed lines shows a fitting using a parabolic function, from (B) through (G) in FIG. 5.

Figure 6:
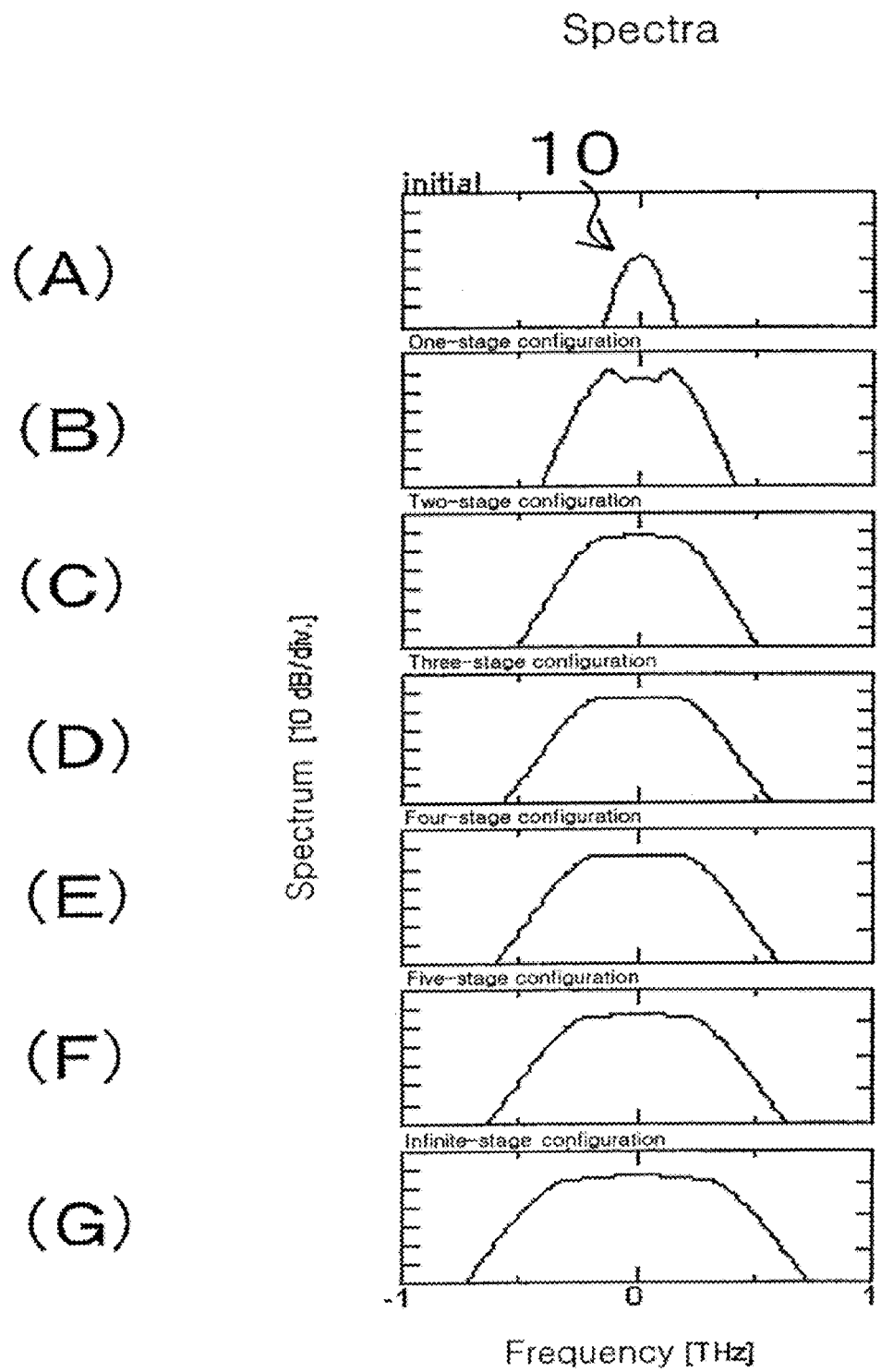
FIG. 6 is a graph showing spectra for an input pulse or for output pulses in the case of changing the value of the stage number, from (A) through (G).

Furthermore, in FIG. 6, (A) shows the spectrum for the input pulse 10, and (B) to (G) show spectra for the output pulse in the case of changing the value of the stage number.

Figure 5:
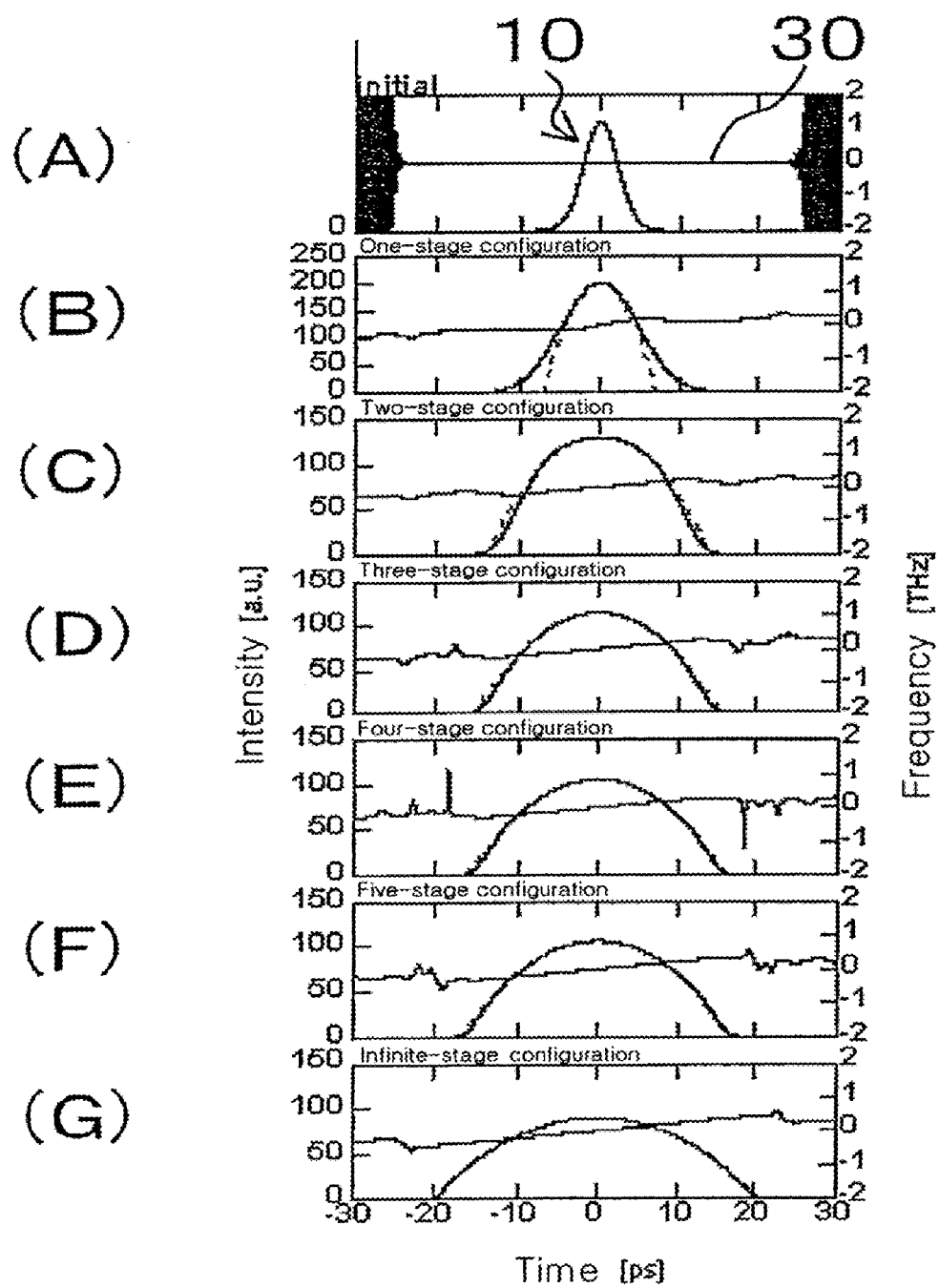
FIG. 5 is a graph showing relationships between a time waveform and a chirp for an input pulse or for output pulses in the case of changing a value of the stage number, from (A) through (G).

According to FIG. 5: from (A) through (G) and FIG. 6: from (A) through (G), the following simulated results are obtained.

1. The input pulse becomes a parabolic functional pulse having the linear chirp by the multistage connection of the DCFs 4 and the EDFs 5.
 2. The waveform of the input pulse becomes closer to parabolic functional in the case of the stage number as not less than three-stage. That is to say, it becomes an ideal parabolic functional pulse in the case of the stage number as not less than three-stage.

The Second Embodiment

Figure 7:
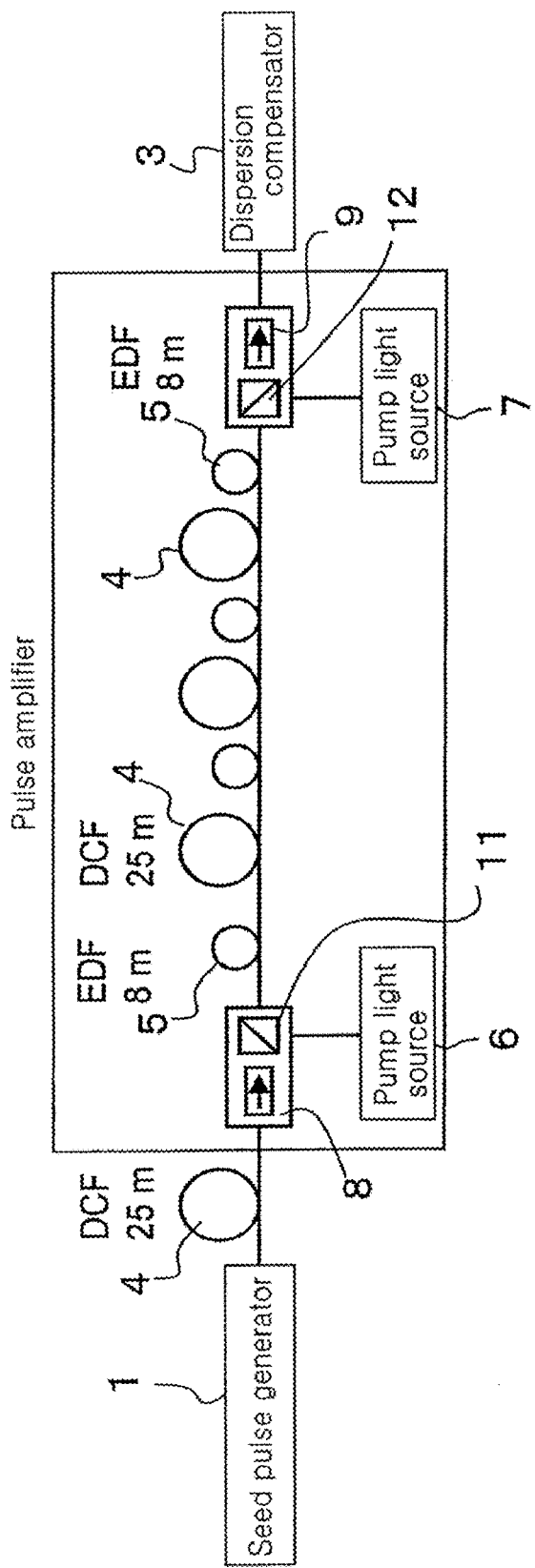
FIG. 7 is a view showing a brief configuration of a pulse light source according to the second embodiment of the present invention.

Next, a pulse light source according to the second embodiment of the present invention will be described in detail below, based on FIG. 7 to FIG. 13. FIG. 7 shows a brief configuration of the pulse light source according to the present embodiment, as the brief configuration of the pulse light source for the actual experiment (the experimental configuration) used by the present inventors.

According to the pulse light source as shown in FIG. 7, the first DCF 4 is arranged outside the package of the pulse amplifier 2, for avoiding from decreasing a power of a pump light output from the pump light source 6 due to a fusion splice loss of the DCFs 4. And then it becomes able to increase the power of the pump light, because the pump light output from the pump light source 6 is to be input into the first EDF 5 without passing through a fusion splice point between the DCF 4 and the EDF 5. Moreover, a configuration comprised of a grating pair is used for the dispersion compensator. Meanwhile, other configurations are similar to that according to the first embodiment as shown in FIG. 1.

An experiment is performed under the following conditions, using the pulse light source as shown in FIG. 7. Here, the DCF length is 25 m and the EDF length is 8 m regarding such the pulse light source.

Experimental Configuration
  1. Seed pulse generator 1:
     Configuration: for amplifying a gain-switched light source using an EDFA (not shown); and for suppressing an amplified spontaneous emission (ASE) using a band pass filter (BPF: not shown),
     Repetition frequency: 10 MHz,
     Pulse energy: 17 pJ,
     Pulse width: 5.7 ps.
  2. DCF 4:
     Gain: −0.5 dB/km,
     Dispersion: −125 ps/nm/km,
     Nonlinear coefficient: 5.3/W/km.
  3. EDF 5:
     Gain: 1.1 dB/m,
     Dispersion: −4.9 ps/nm/km,
     Nonlinear coefficient: 7.5/W/km.

According to the experiment using the pulse light source as shown in FIG. 7, the pulse energy of the output pulse from the seed pulse generator becomes 17 pJ (an average power of −7.64 dBm), the pulse energy of the output pulse from the pulse amplifier becomes 2.2 nJ (the average power of 13.40 dBm), and the pulse energy of the output pulse from the dispersion compensator becomes 1.5 nJ (the average power of 15.34 mW).

Figure 8:
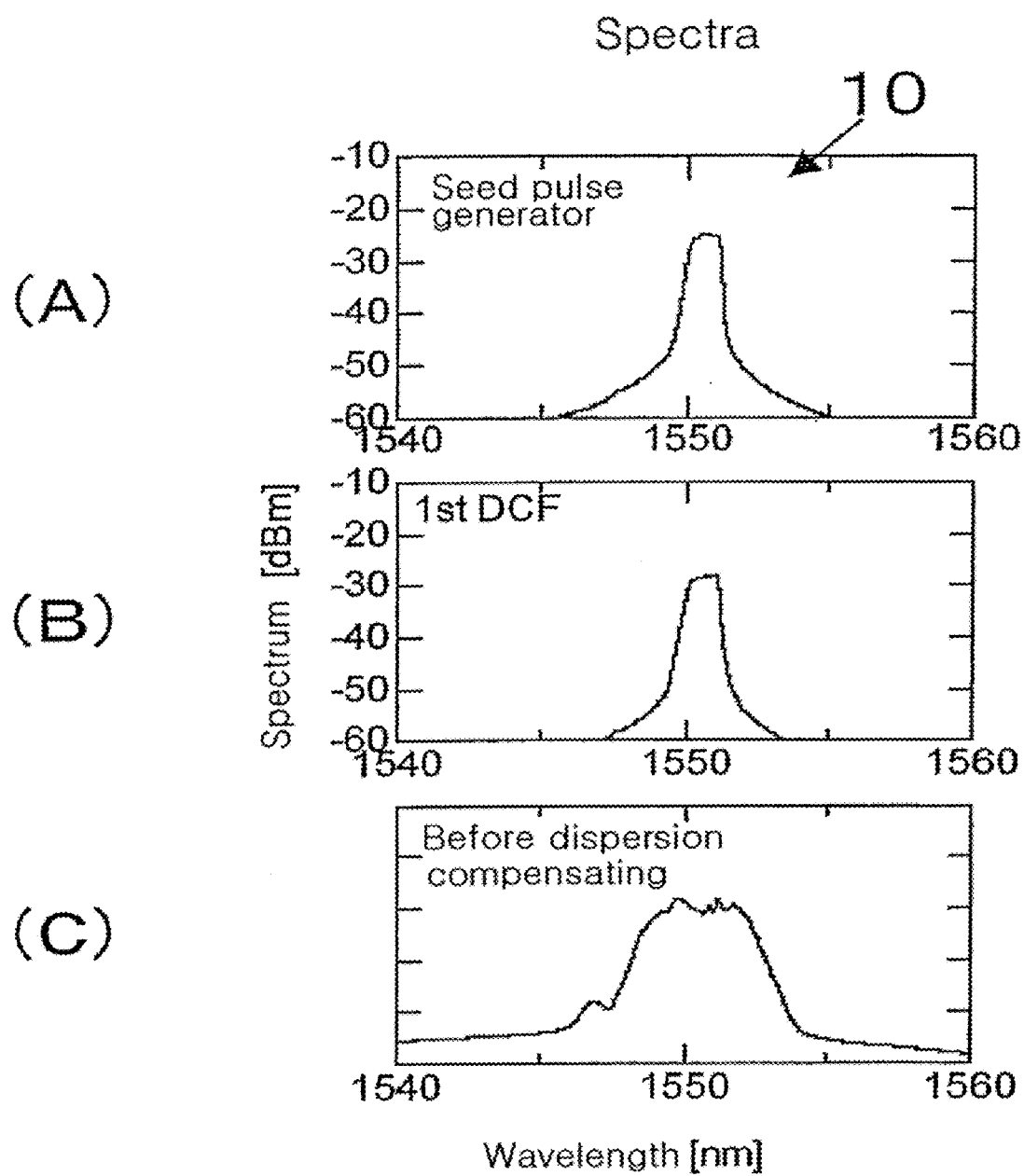
FIG. 8 is a graph showing spectra: (A) is for an input pulse output from a seed pulse generator; (B) is for a light pulse after propagating through the first DCF; and (C) is for a light pulse output from a pulse amplifier.
Figure 9:
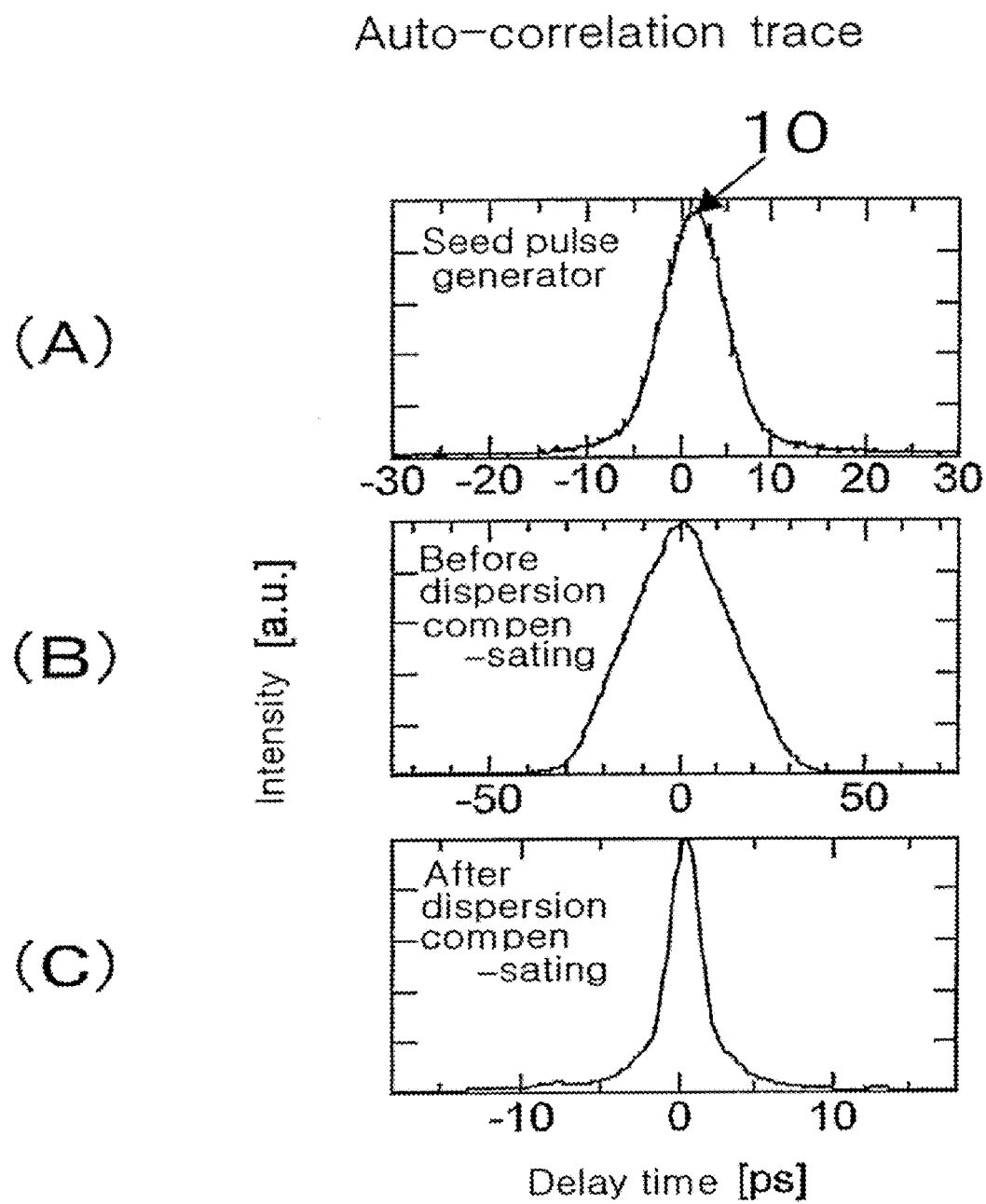
FIG. 9 is a graph showing auto-correlation traces: (A) is for an input pulse output from a seed pulse generator; (B) is for a light pulse output from a pulse amplifier; and (C) is for a light pulse after dispersion compensating in a dispersion compensator.
Figure 10:
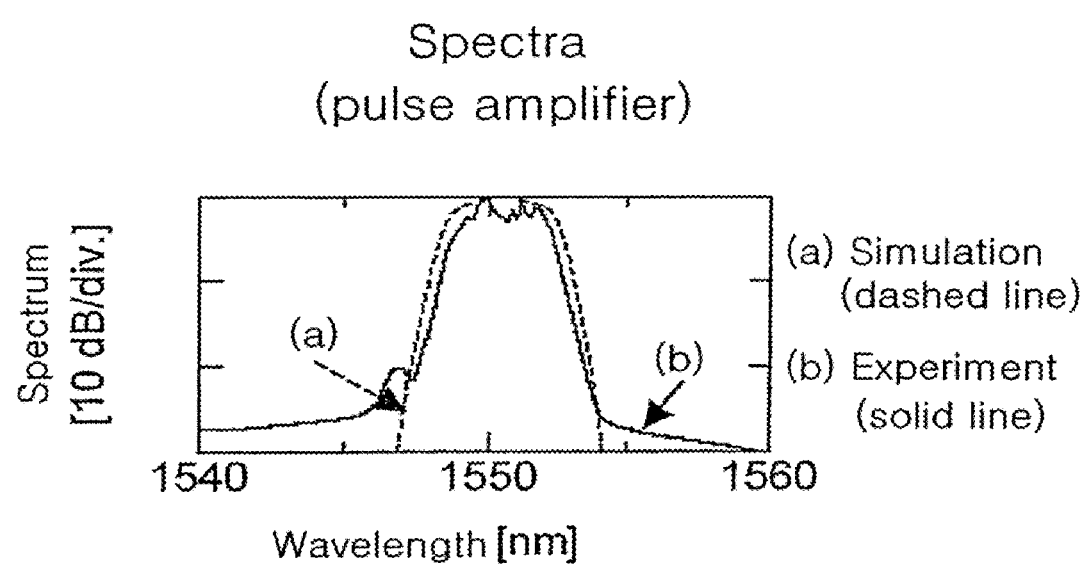
FIG. 10 is a graph showing a spectrum regarding a light pulse output from a pulse amplifier: (S) is a result from a simulation; and (E) is an experimental result.
Figure 11:
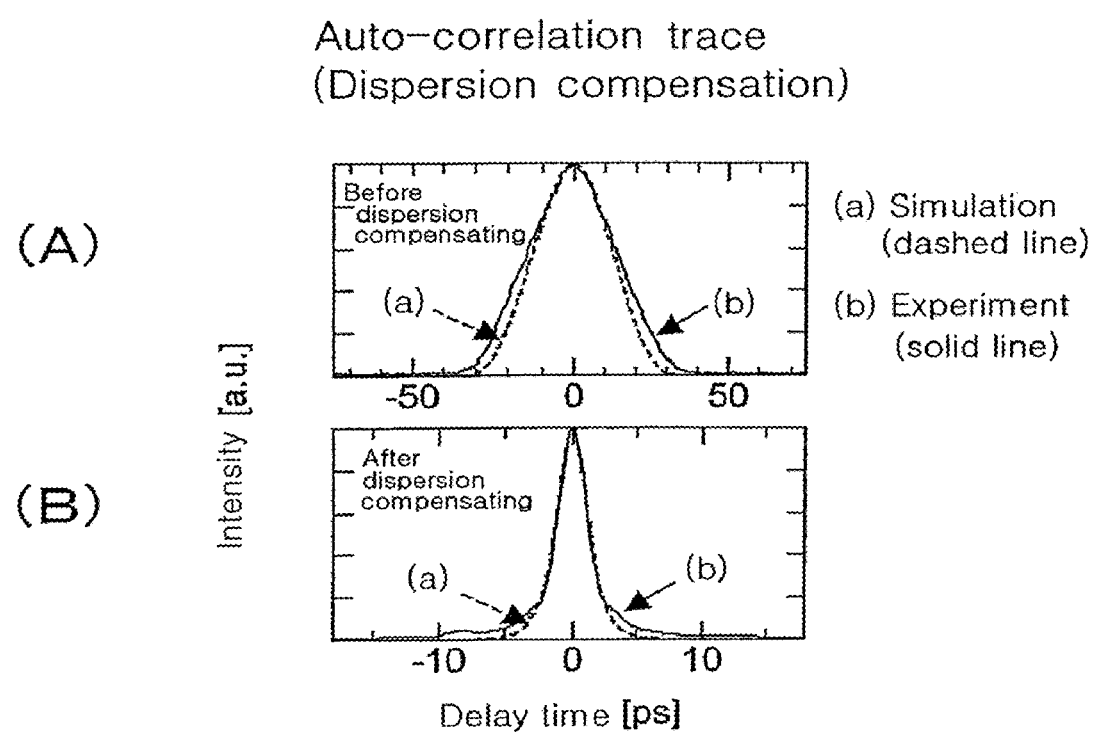
FIG. 11 is a graph showing auto-correlation traces: (A) is for a light pulse before dispersion compensating in a dispersion compensator; and (B) is for the light pulse after dispersion compensating in the dispersion compensator, (S) is a result from a simulation and (E) is an experimental result respectively therein.

The experimental results using the pulse light source as shown in FIG. 7 are shown in FIG. 8 and FIG. 9. Moreover, the comparison between the experiment and the simulation is shown in FIG. 10 and FIG. 11. In FIG. 8, (A) shows a spectrum of the input pulse 10 output from the seed pulse generator 1, (B) shows a spectrum of the light pulse after propagating through the first DCF 4, and (C) shows a spectrum of the light pulse output from the pulse amplifier 2. Moreover, in FIG. 9, (A) shows an auto-correlation trace of the input pulse 10 output from the seed pulse generator 1. Here, the full width at half maximum of such the input pulse 10 is estimated as 5.7 pS by a fitting using an auto-correlation trace as a Gaussian waveform. Furthermore, (B) shows the auto-correlation trace of the light pulse output from the pulse amplifier 2, and (C) shows the auto-correlation trace of the light pulse after dispersion compensating using the dispersion compensator 3 respectively, in FIG. 9.

According to FIG. 8: from (A) through (C), the following experimental results are obtained.

1. The spectrum of the light pulse is broadened which is output from the pulse amplifier 2, and the light pulse of the wide bandwidth is output from the pulse amplifier 2.

2. The input pulse 10 with the pulse width of 5.7 ps is compressed, and the light pulse with the pulse width of 2.0 ps is generated, by dispersion compensating using the dispersion compensator 3.

Figure 12:
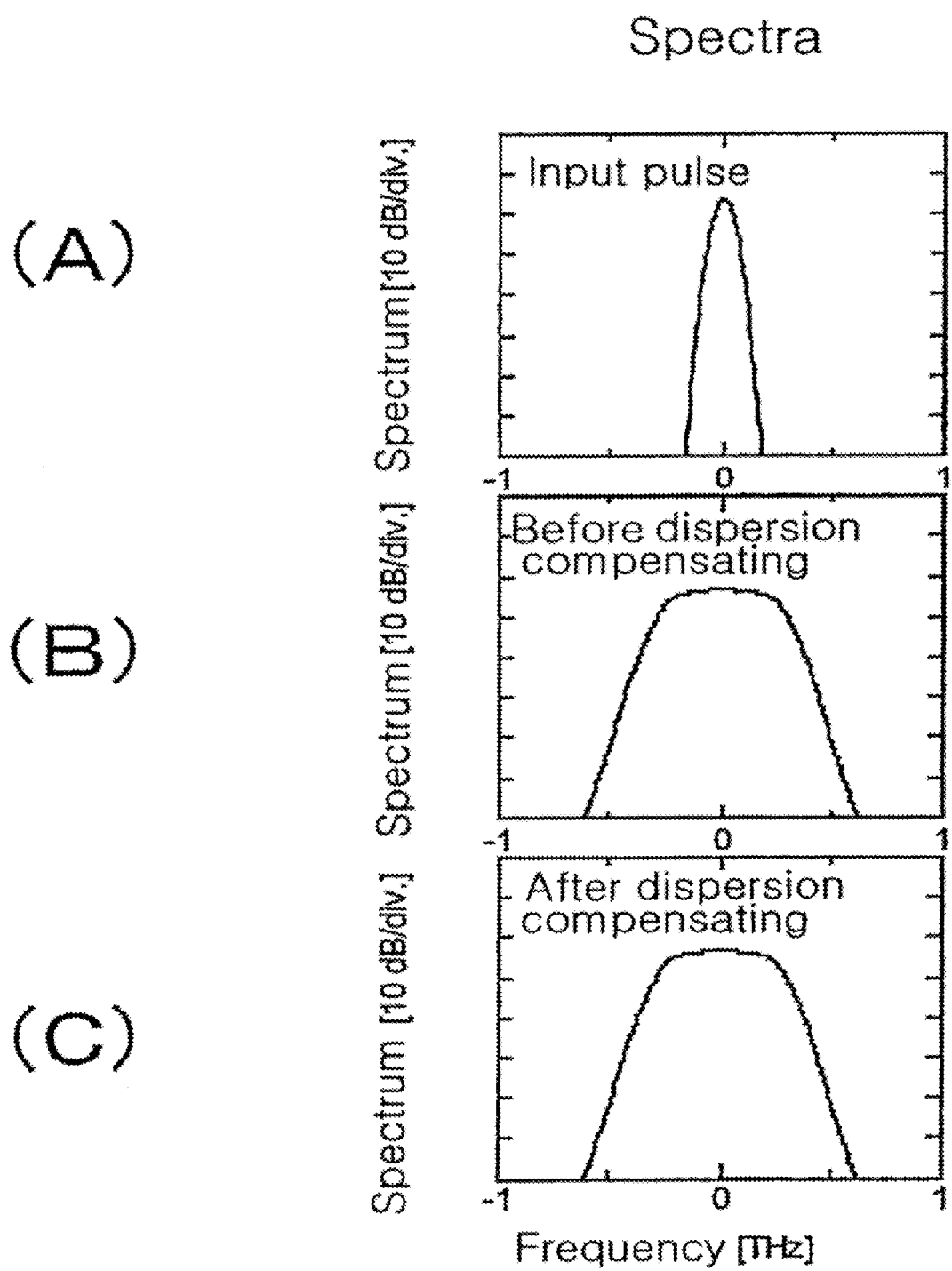
FIG. 12 is a graph showing spectra obtained by a simulation regarding the configuration of the pulse light source according to the second embodiment: (A) is for an input pulse output from a seed pulse generator; (B) is for a light pulse before dispersion compensating in a dispersion compensator; and (C) is for the light pulse after dispersion compensating in the dispersion compensator.
Figure 13:
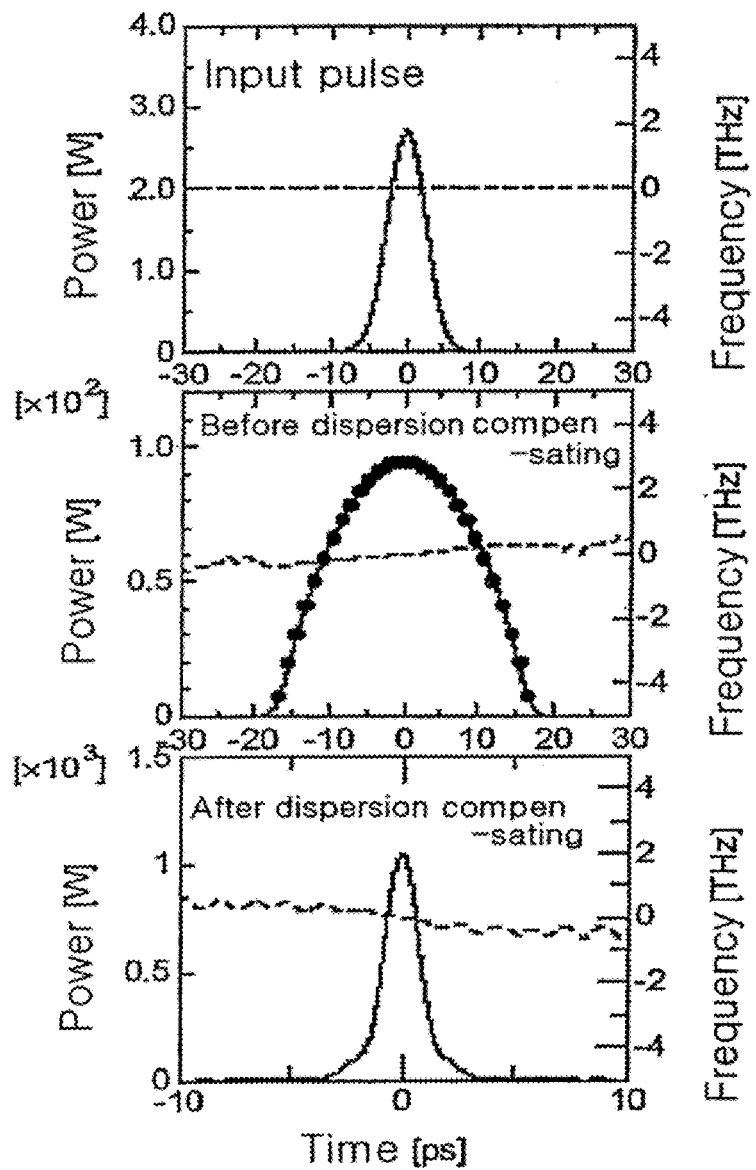
FIG. 13 is a graph showing relationships between a time waveform and a chirp obtained by a simulation regarding the configuration of the pulse light source according to the second embodiment: (A) is for an input pulse output from a seed pulse generator; (B) is for a light pulse before dispersion compensating in a dispersion compensator; and (C) is for the light pulse after dispersion compensating in the dispersion compensator.

Meanwhile, the simulated results are shown in FIG. 12 and FIG. 13, for the input pulse 10 (a seed pulse as an output pulse from the seed pulse generator 1), for the light pulse before propagating through the dispersion compensator 3 (before dispersion compensating) as an output pulse from the pulse amplifier 2, and for the light pulse after propagating through the dispersion compensator 3 (after dispersion compensating), regarding the pulse light source as shown in FIG. 7. In FIG. 12, from (A) through (C) show spectal results obtained by the simulation. In FIG. 13, from (A) through (C) show time waveforms with the solid lines and chirps with the dashed lines respectively, that are obtained by the simulation. Moreover, the time waveform before dispersion compensating is plotted using dots of black filled circle by a parabolic fitting. Here, it is obvious that the time waveform before dispersion compensating is in excellent correspondence with the parabolic fitting. Furthermore, it is obvious that the chirp is a linear functional.

FIG. 10 is a graph showing a spectrum regarding a light pulse output from the pulse amplifier 2, with comparing the simulated result to the result obtained from the experiment performed using the pulse light source as shown in FIG. 7. In FIG. 11, (A) and (B) are graphs showing auto-correlation traces for a light pulse before dispersion compensating or after dispersion compensating using the dispersion compensator 3 respectively, with comparing the simulated result to the result obtained from such the experiment. Here, in FIG. 10 and FIG. 11, dashed curve lines (S) show the simulated results, and solid curved lines (E) show the experimental results respectively.

It is obvious that the simulated results are in excellent correspondence with the experimental results respectively, regarding each of the spectra shown in FIG. 10 and each of the auto-correlation traces shown in FIG. 11.

Here, it is also able to embody according to the present invention, with modifying as follows.

1. It may be available to use a configuration for the pulse amplifier 2 that a pump light is to be input from the one pump light source 6 arranged in front of an EDF 5 as a forward pump, or a pump light is to be input from the one pump light source 7 arranged at the back of an EDF 5 as a backward pump regarding the above mentioned first and the second embodiments.

2. It may be available to use either configuration of inputting the pump light via the normal dispersion medium (DCF 4) or of inputting directly into the amplification medium (EDF 5), if the configuration is that anyhow the pump light is input into the amplification medium (EDF 5), because the pump light is required exactly therefor.

3. A position for inputting a pump light may be arranged anywhere among the normal dispersion media (DCFs 4) and the amplified media (EDFs 5) multistage-connected therebetween.

4. Regarding the amplification medium 5 according to the above mentioned first and the second embodiments, it may be also available to use that properly chosen from rare earth doped optical fibers, such as a thulium (Tm) doped optical fiber (TDF), an ytterbium (Yb) doped optical fiber (YbDF), or the like, instead of the EDF.

5. According to the first and the second embodiments, the EDFs 4 and the EDFs 5 are multistage-connected alternately in order of the DCF 4 first and then the EDF 5 next. However, it may be also available to multistage connect the DCF 4 and the EDF 5 alternately in order of the EDF 5 first and then the DCF 4 next.

6. Regarding the above mentioned first and the second embodiments, may be available to arrange either one of the normal dispersion medium or the amplification medium at an end part for the normal dispersion media (DCFs 4) and the amplified media (EDFs 5) that are multistage-connected alternately.

7. In the case of a configuration that the amplification medium is to be at the end part therefor, less amount of dispersion compensating is required in the dispersion compensator 3, comparing to that using a configuration that the normal dispersion medium is to be at the end part therefor. Meanwhile, in the case of a configuration that the normal dispersion medium is to be at the end part therefor, it is easier to change an input pulse to a light pulse closer to an ideal parabolic functional pulse therefrom and to output the light pulse.

8. According to the pulse amplifier 2 regarding the above mentioned first embodiment, all plural pairs of the DCFs 4 and the EDFs 5 are arranged in a same package. However, it may be also available to use a configuration that plural pairs of the DCFs 4 and the EDFs 5 are to be divided into a plurality of groups, and then any of such the groups are to be arranged in any of packages.

9. Regarding the above mentioned first and the second embodiments, it may be also available to use a configuration that the dispersion compensator 3 is to be comprised of an anomalous dispersion optical fiber. Moreover, it may be also available to use a dispersion compensator with using such as a prism or the like.

10. Regarding the above mentioned first and the second embodiments, it may be also available to use a configuration comprised of a Faraday rotator mirror (FRM), instead of the configuration that the DCF 4 and the EDF 5 are comprised of the polarization maintaining type fibers respectively, and that each of the optical fibers for connecting to between each element in the pulse light source is also comprised of the polarization maintaining type fibers respectively. Here, such the FRM is comprised of a Faraday rotator and a mirror, and then a turned light is to be rotated ninety degrees for a plane of polarization thereof.

Moreover, the pulse light source using such the FRM comprises a polarizing beam splitter (PBS) for inputting a linearly polarized input pulse output from the seed pulse generator 1 thereinto, wherein the input pulse is to be input from either one of two optical paths divided by such the PBS. Moreover, the FRM is arranged with using a port for polarization multiplexing, via the DCF 4 as the fiber of non-polarization maintaining type and the EDF 5 as the fiber of non-polarization maintaining type that are multistage-connected alternately therebetween. Furthermore, a light pulse turned by the FRM is to be output from the other optical path divided by the PBS.

According to the pulse light source comprising such the configuration, a polarization state of an input pulse is to be changed randomly at the period of propagating through the DCF 4 or the EDF 5 as the fiber of non-polarization maintaining type. Moreover, such the input pulse is to be turned by the FRM with being rotated ninety degrees for the plane of polarization thereof, and then it propagates the similar optical path. Hence, a fluctuation of polarization that the input pulse receives at the period of propagating through the DCF 4 or the EDF 5 for an outward is to be canceled by the fluctuation of polarization that the input pulse receives at the period of propagating through the EDF 5 or the DCF 4 for a homeward. Moreover, such the light pulse is to be reflected by the PBS, and then it is to be input with having a linear polarization into the dispersion compensator 3. And at last, a linearly polarized light pulse is to be output from the dispersion compensator 3 after dispersion compensating thereof.

Thus, it becomes able to realize a pulse light source for generating a linearly polarized light pulse by such the configuration, and then it is desirable from the application point of view. Moreover, it is not required to use a polarization maintaining type fiber for an optical fiber for connecting to between the DCF 4, the EDF 5 and the FRM regarding such the pulse light source using the FRM.

As above described, according to the present invention, it is able to easily obtain proper media for an amplification and for a wider bandwidth with maintaining a linear chirp of a light pulse. Moreover, it is able to realize a pulse amplifier and a pulse light source using the same, for easy designing and for lower manufacturing cost by using therewith. Furthermore, it is able to obtain a short pulse with an ideal waveform in a wide bandwidth range by dispersion compensating, because an input pulse is to be output as the light pulse having the linear chirp.

What is claimed is:

1. A pulse amplifier, comprising:
an amplification medium and a normal dispersion medium that are multistage-connected alternately, to change an input pulse to a light pulse having a linear chirp in a bandwidth range of wider than that for the input pulse and to output the light pulse,
wherein the normal dispersion medium is a dispersion compensating medium and an absolute value of a dispersion of the normal dispersion medium is larger than an absolute value of a dispersion of the amplification medium,
wherein each subsequent stage of the multi-stage connected media increases an intensity of the output light pulse, and
wherein each subsequent stage of the multi-stage connected media widens a spectrum width of the output light pulse.

2. The pulse amplifier of claim 1,
wherein the multistage-connected media include at least three in total of the amplification media and the normal dispersion media that are multistage-connected alternately.

3. The pulse amplifier of claim 1 or 2,
wherein the amplification medium is a rare earth doped optical fiber.

4. The pulse amplifier of claim 3,
wherein the dispersion of the rare earth doped optical fiber is a normal dispersion.

5. The pulse amplifier of claim 1,
wherein the amplification medium and the normal dispersion medium are a polarization maintaining type.

6. The pulse amplifier of claim 1,
wherein a time waveform of the light pulse having the linear chirp is parabolic functional.

7. The pulse amplifier of claim 1,
wherein the normal dispersion media and the amplification media are multistage-connected as not less than three stages.

8. A pulse light source, comprising:
a seed pulse generator for outputting a seed pulse; and
a pulse amplifier comprising an amplification medium and a normal dispersion medium that are multistage-connected alternately,
wherein the pulse amplifier changes an input pulse to a light pulse having a linear chirp in a bandwidth range of wider than that for the input pulse and outputs the light pulse,
wherein the normal dispersion medium is a dispersion compensating medium and an absolute value of a dispersion of the normal dispersion medium is larger than an absolute value of a dispersion of the amplification medium,
wherein each subsequent stage of the multi-stage connected media increases an intensity of the output light pulse, and
wherein each subsequent stage of the multi-stage connected media widens a spectrum width of the output light pulse.

9. The pulse light source of claim 8,
wherein the multistage-connected media include at least three in total of the amplification media and the normal dispersion media that are multistage-connected alternately.

10. The pulse light source of claim 8 or 9,
wherein the amplification medium is a rare earth doped optical fiber.

11. The pulse light source of claim 10,
wherein the dispersion of the rare earth doped optical fiber is a normal dispersion.

12. The pulse light source of claim 8,
wherein the amplification medium and the normal dispersion medium are a polarization maintaining type.

13. The pulse light source of claim 8,
wherein a time waveform of the light pulse having the linear chirp is parabolic functional.

14. The pulse light source of claim 8,
wherein a full width at half maximum of the seed pulse output from the seed pulse generator is not less than two picoseconds.

15. The pulse light source of claim 8,
wherein the seed pulse generator comprises a laser source of a direct modulating type for a semiconductor laser, as a seed pulse light source for outputting a seed pulse.

16. The pulse light source of claim 15,
wherein the laser source is a gain switch light source for gain switch driving the semiconductor laser.

17. The pulse light source of claim 8, further comprising:
a dispersion compensator for further dispersion compensating a light pulse output from the pulse amplifier.

18. The pulse light source of claim 17,
wherein the dispersion compensator is an anomalous dispersion fiber.

19. The pulse light source of claim 17,
wherein the dispersion compensator is comprised of a grating pair.

20. The pulse light source of claim 8,
wherein the normal dispersion media and the amplification media are multistage-connected as not less than three stages.

21. The pulse amplifier of claim 1, wherein the multistage-connected media include a plurality of the amplification media and a plurality of the normal dispersion media, each of the plurality of the amplification media used in each stage of the multi-stage connected media is the same, and each of the plurality of the normal dispersion media used in each stage of the multi-stage connected media is the same.

22. The pulse amplifier of claim 2,
wherein the multistage-connected media, which include at least three in total of the amplification media and the normal dispersion media, are arranged in a same package, a first isolator and a first wavelength divisional multiplex coupler are positioned at an input of the package, and a second isolator and a second wavelength divisional multiplex coupler are positioned at an output of the package.

23. The pulse amplifier of claim 3, wherein the normal dispersion medium is a dispersion compensation fiber.

24. The pulse light source of claim 9,
wherein the multistage-connected media, which include at least three in total of the amplification media and the normal dispersion media, are arranged in a same package, a first isolator and a first wavelength divisional multiplex coupler are positioned at an input of the package, and a second isolator and a second wavelength divisional multiplex coupler are positioned at an output of the package.

25. The pulse amplifier of claim 4, wherein an absolute value of the accumulated dispersion is increased from an input to an output of the pulse amplifier.

26. The pulse light source of claim 8, further comprising:
a dispersion compensator arranged after an output of the pulse amplifier, wherein the dispersion compensator compresses a time of the output light pulse so that the time thereof becomes shorter than a time of the pulse of the light output from the seed pulse generator.

27. The pulse light source of claim 11, wherein an absolute value of the accumulated dispersion is increased from an input to an output of the pulse amplifier.

28. A pulse amplifier, comprising:
an amplification medium and a normal dispersion medium that are multistage-connected alternately, to change an input pulse to a light pulse having a linear chirp in a bandwidth range of wider than that for the input pulse and to output the light pulse,
wherein the normal dispersion medium is a dispersion compensating medium and an absolute value of a dispersion of the normal dispersion medium is larger than an absolute value of a dispersion of the amplification medium,
wherein the multistage-connected media include at least three in total of the amplification media and the normal dispersion media that are multistage-connected alternately, and
wherein the multistage-connected media, which include at least three in total of the amplification media and the normal dispersion media, are arranged in a same package, a first isolator and a first wavelength divisional multiplex coupler are positioned at an input of the package, and a second isolator and a second wavelength divisional multiplex coupler are positioned at an output of the package.

29. A pulse light source, comprising:
a seed pulse generator for outputting a seed pulse; and
a pulse amplifier comprising an amplification medium and a normal dispersion medium that are multistage-connected alternately, wherein the pulse amplifier changes an input pulse to a light pulse having a linear chirp in a bandwidth range of wider than that for the input pulse and outputs the light pulse, wherein the normal dispersion medium is a dispersion compensating medium and an absolute value of a dispersion of the normal dispersion medium is larger than an absolute value of a dispersion of the amplification medium, wherein the multistage-connected media include at least three in total of the amplification media and the normal dispersion media that are multistage-connected alternately, and wherein the multistage-connected media, which include at least three in total of the amplification media and the normal dispersion media, are arranged in a same package, a first isolator and a first wavelength divisional multiplex coupler are positioned at an input of the package, and a second isolator and a second wavelength divisional multiplex coupler are positioned at an output of the package.

* * * * *